United States Patent Office 3,466,887
Patented Sept. 16, 1969

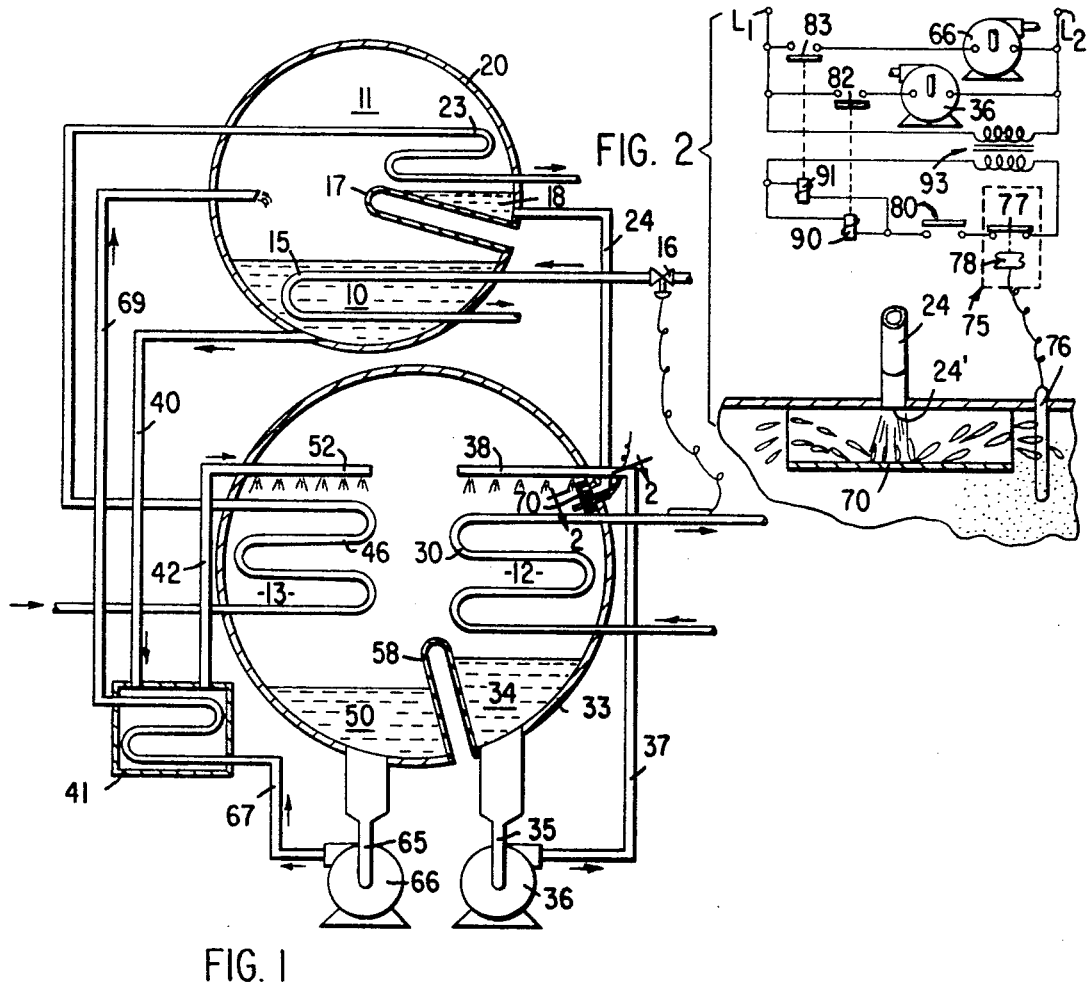

3,466,887
ABSORPTION REFRIGERATION SYSTEM CONTROL
Keith V. Eisberg, Indianapolis, Ind., and Glenn B. Foster, Liverpool, N.Y., assignors to Carrier Corporation, Syracuse, N.Y., a corporation of Delaware
Filed Jan. 30, 1967, Ser. No. 612,543
Int. Cl. F25b 15/00, 49/00
U.S. Cl. 62—141                         4 Claims

ABSTRACT OF THE DISCLOSURE

Low temperature control for absorption refrigeration systems where the control thermal sensitive part is placed in the path of both refrigerant condensate and recirculated refrigerant discharged in the evaporator; there being a baffle for dispersing the stream of entering condenser refrigerant.

---

This invention relates to an absorption refrigeration system, and more particularly to an absorption refrigeration system incorporating an improved low temperature control arrangement.

The dangers incipient in freeze up of absorption refrigeration systems are well known to those familiar with these systems. To protect against freeze up of absorption systems, it is usual to provide control means effective at a certain system temperature condition to render the system inoperative.

It is a principal object of the present invention to provide a new and improved absorption refrigeration system.

It is a further object of the present invention to provide an absorption refrigeration system incorporating an improved control arrangement for preventing system freeze up.

It is an object of the present invention to provide a control adapted to monitor temperature conditions of the condensed refrigerant after entering the system evaporator and effective at a preset refrigerant temperature to render the system inoperative.

It is an object of the present invention to provide an absorption refrigeration system incorporating means to disperse the stream of liquid refrigerant entering the system evaporator.

This invention relates to an absorption refrigeration system comprising a generator section; a condenser section; an evaporator section; and absorber section; means for passing relatively weak solution from the absorber section to the generator section for reconcentration, vaporous refrigerant being conducted from the generator section to the condenser section; means for forwarding condensed refrigerant from the condenser section to the evaporator section; and control means for protecting the system against low temperature conditions; the control means being responsive to temperature conditions of at least the refrigerant discharged by the refrigerant forwarding means into the evaporator section.

Other objects and advantages will be readily perceived from the ensuing description and drawings in which:

FIGURE 1 is a schematic view of an absorption refrigeration system incorporating the low temperature protective control means and refrigerant dispersion means of the present invention; and FIGURE 2 is an enlarged view showing the relative locations of the control means thermal sensitive probe and the refrigerant dispersion means, and a wiring diagram for the system of FIGURE 1.

The absorption refrigeration system of the present invention preferably employs water as a refrigerant, and a solution of lithium bromide as an absorbent. It is understood that other refrigerants and absorbents may be used. As used herein, the term "strong solution" refers to a concentrated solution of lithium bromide which is strong in absorbing power; the term "weak solution" refers to a dilute solution of lithium bromide which is weak in absorbing power.

Referring to FIGURE 1 of the drawing, there is shown an absorption refrigeration system including a generator section 10, a condenser section 11, an evaporator section 12, and an absorber section 13 interconnected to provide refrigeration. Generator and condenser sections 10, 11 and evaporator and absorber sections 12, 13 are preferably encased within unitary shells 20, 33 respectively.

Generator section 10 includes a heat exchanger 15 within which a suitable heating medium, such as steam or hot water, may be circulated. Control valve 16 may be provided to regulate the input of heating medium to heat exchanger 15 in accordance with system load.

Weak solution is heated in generator section 10 to boil off refrigerant vapor thereby concentrating the weak solution. The refrigerant vapor passes into condenser section 11, which may be effectively separated from generator section 10 by inwardly projecting partitioning section 17 of shell 20. The upper wall of partitioning section 17 cooperates with the adjacent wall of shell 20 to form a sump 18 within which refrigerant condensate may accumulate.

Condenser section 11 comprises a plurality of heat exchange tubes 23 through which a suitable cooling medium such as water is passed. Refrigerant vapor is condensed by the cooling medium passing through tubes 23. The refrigerant condensate accumulate in sump 18. Condensate line 24, which opens into sump 18 of condenser section 11, conveys the refrigerant condensate to evaporator section 12. Preferably, condensate line 24 opens into evaporator section 12 just below spray nozzles 38.

Heat exchange tubes 30 in evaporator section 12 are disposed in a tube bundle located in a region of shell 33. Water or other heat exchange fluid to be cooled is passed through tubes 30 in heat exchange relation with refrigerant supplied over the exterior surfaces of the tubes. Heat is absorbed from the water to be cooled by the refrigerant thereby cooling the water in tubes 30 and vaporizing refrigerant on the exterior surfaces of the tubes. The vaporized refrigerant passes from evaporator section 12 into absorber section 13 carrying with it the heat absorbed from the water passed through tubes 30. The chilled water may be circulated to a place of use as desired. Eliminators (not shown) may be provided in the vapor path between absorber section 13 and evaporator section 12.

Shell 33 forms a sump 34 under evaporator section tubes 30 to receive unevaporated liquid refrigerant which drips off the lower rows of tubes 30. A refrigerant recirculation line 35 receives refrigerant from sump 34, the refrigerant being pumped by pump 36 through line 37 to nozzles 38 where it is again discharged over the top of the tube bundle in the evaporator section.

Strong solution taken from the lower portion of generator section 10 flows through strong solution line 40 into heat exchanger 41 where it is placed in heat exchange relation with weak solution passing to the generator. Strong solution leaves heat exchanger 41 through line 42 and is distributed by spray nozzles 52 over the absorber heat exchanger tubes 46 to wet the absorber tubes. Cooling water or other suitable cooling medium is passed through tubes 46 to cool the absorbent solution sprayed on the exterior surfaces thereof.

The liquid refrigerant in sump 34 and the weak solution in sump 50 are at different temperatures. To maintain physical as well as thermal separation therebetween, the base of shell 33 is provided with a longitudinally extending upstanding partition member 58.

Absorbent solution is withdrawn from absorber section 13 through weak solution line 65. Weak solution is forwarded by pump 66 through line 67, heat exchanger 41 and line 69 to generator section 10 for reconcentration.

To prevent splashing of the refrigerant emitted from refrigerant line 24 into evaporator section 12, there is provided a dispersion baffle 70. Baffle 70 is generally U-shaped when viewed in cross section and is fixedly secured to the inside wall of shell 33 so as to overlay the discharge end 24' of line 24. As best seen in FIGURE 2 of the drawings, the stream of liquid refrigerant and flash vapor discharging from the terminal end 24' of line 24 strikes baffle 70 and is dispersed into two substantially opposed streams. The dispersed streams pass over the ends of baffle 70 into evaporator section 12.

To protect the absorption refrigeration system from low internal temperature conditions and possible freeze up of the system, that is, freeze up of the heat exchange fluid in evaporator tubes 30, there is provided a low temperature control 75 adapted at a preset low system temperature to shut down the system. Referring particularly to FIGURE 2, the low temperature control 75 includes a suitable thermal or temperature sensitive part or probe 76, a switch 77 arranged in series with the energizing circuits to motors of refrigerant and solution pumps at 36, 66 respectively, and a suitable switch actuating means 78.

The drive motors of the refrigerant and solution pumps 36, 66 respectively are connected through contacts 82, 83 respectively to a suitable source of electrical power, designated generally by leads $L_1$, $L_2$ in the exemplary showing of the drawing. Refrigerant and solution pump contactor coils 90, 91 respectively are connected, through control switch 80 and the normally closed switch 77 of low temperature control 75, across the secondary winding of stepdown transformer 93. It is understood that closure of control switch 80 completes the energizing circuits to contactor coils 90, 91 closing contacts 82, 83 to energize refrigerant and solution pumps 36, 66 respectively. At shut down of the system, control switch 80 is opened to deenergize contactor coils 90, 91 and stop pumps 36, 66 respectively.

To obtain optimum accuracy and response, probe 76 of low temperature control 75 is arranged within evaporator shell 33 preferably in the streams of refrigerant discharged from both terminal end 24' of line 24 and nozzles 38. Preferably, probe 76 projects into shell 33 adjacent one end of baffle 70 so that a portion of the stream of liquid refrigerant dispersed by baffle 70 and passing outwardly through the space between shell 33 and baffle 70 impinges directly upon probe 76. Probe 76 is additionally arranged so that liquid discharged from nozzles 38 strikes at least a part of probe 76.

If the refrigerant included an appreciable amount of absorbent, that is, is relatively impure, the temperature of the refrigerant-absorbent mixture may not accurately reflect low temperature conditions of the system since temperatures of a refrigerant-absorbent mixture are normally higher than temperatures of refrigerant alone. Inasmuch as temperature conditions of the refrigerant alone determine the propensity of the system to freeze up, under such conditions the system may freeze before the low temperature control can respond.

By arranging probe 76 of low temperature protector 75 in the stream of relatively pure refrigerant emitted from line 24 into evaporator section 12, the accuracy of the protector 75 and hence the protection afforded thereby is assured.

Additionally, the positioning of at least a part of probe 76 of low temperature protector 75 in the stream of recirculated refrigerant introduced into evaporator section 12 through nozzles 38 assures low temperature protection of the system during periods when the load on the system is non-existent or extremely light with corresponding termination or reduction in the emission of condensate from line 24.

Where during operation of the absorption refrigeration probe 76 of low temperature protector 75 fall below the preset response temperature of protector 75, switch 77 thereof is opened to interrupt the energizing circuits to contactor coils 90, 91. Deenergization of coils 90, 91 opens contacts 82, 83 respectively to deenergize refrigerant and solution pumps 36, 66 respectively.

While we have described a preeferred embodiment of our invention it will be understood that the invention is not limited thereto, but may be otherwise embodied within the scope of the following claims.

We claim:

1. In an absorption refrigeration system having a generator section, a condenser section, an evaporator section and an absorber section, the combination of: means for passing relatively weak solution from said absorber section to said generator section for reconcentration, vaporous refrigerant being conducted from said generator section to said condenser section; means for forwarding condensed refrigerant from said condenser section to said evaporator section; said condensed refrigerant being flash cooled upon discharge in the evaporator section and control means for protecting said system against low temperature conditions, said control means being responsive to temperature conditions of at least the refrigerant discharged by said forwarding means into said evaporator section, said control means including a thermal sensitive part disposed in said evaporator section so that immediately upon entry into the evaporator at least a portion of the flash cooled condensed refrigerant discharged by said forwarding means impinges on said thermal part.

2. An absorption refrigeration system according to claim 1 in which said evaporator section includes a plurality of heat exchanger tubes, means for recirculating refrigerant in said evaporator section, said recirculating means being adapted to discharge recirculated refrigerant over said heat exchanger tubes, said control means thermal sensitive part being arranged in said evaporator section so that at least a portion of said recirculated refrigerant impinges on said control means thermal part.

3. An absorption refrigeration system according to claim 1 in which said evaporator section includes a shell, said refrigerant forwarding means including a discharge opening in said evaporator section shell from which refrigerant from said condenser section is discharged, a baffle in said shell opposite to and spaced from said discharge opening so that the stream of refrigerant discharged from said opening strikes said baffle whereby said baffle disperses said refrigerant stream, said control means thermal sensitive part being adjacent one side of said baffle in the path of the refrigerant leaving said baffle.

4. An absorption refrigeration system according to claim 1 in which said refrigerant comprises flash cooled condensate.

References Cited

UNITED STATES PATENTS

| 3,005,318 | 10/1961 | Miner | 62—141 |
| 3,122,002 | 2/1964 | Miner et al. | 62—141 |
| 3,279,206 | 10/1966 | Leonard | 62—141 |
| 3,287,928 | 11/1966 | Reid | 62—476 |
| 3,320,760 | 5/1967 | Swearingen | 62—141 |

LLOYD L. KING, Primary Examiner

U.S. Cl. X.R.

62—476